Aug. 19, 1969     J. E. OLIVER     3,462,123
JACKING AND SUPPORT MECHANISM FOR VERTICALLY EXTENSIBLE CAMPER
Filed Sept. 19, 1966     2 Sheets-Sheet 1

INVENTOR.
JOSEPH E. OLIVER
BY Lothrop & West
ATTORNEYS

Aug. 19, 1969    J. E. OLIVER    3,462,123
JACKING AND SUPPORT MECHANISM FOR VERTICALLY EXTENSIBLE CAMPER
Filed Sept. 19, 1966    2 Sheets-Sheet 2
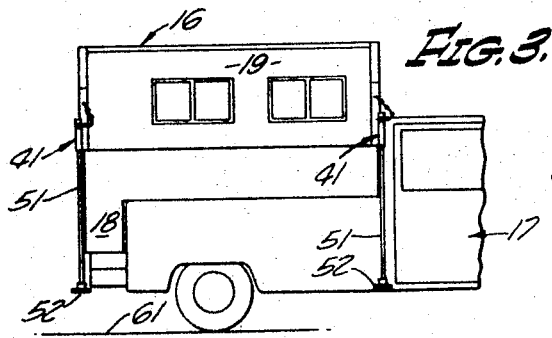
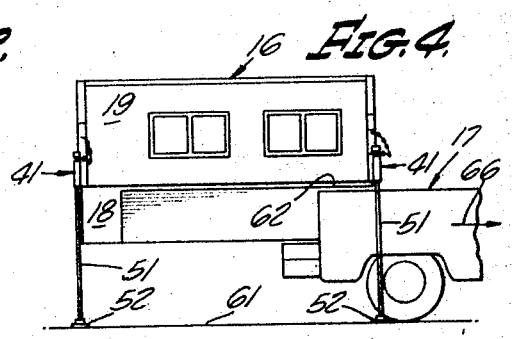
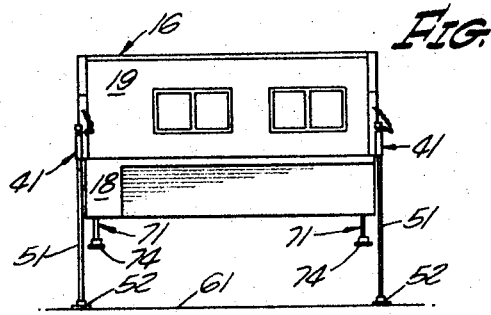
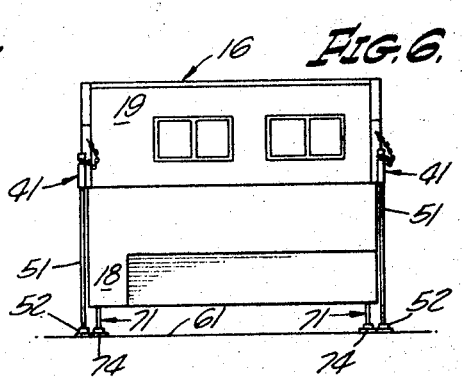
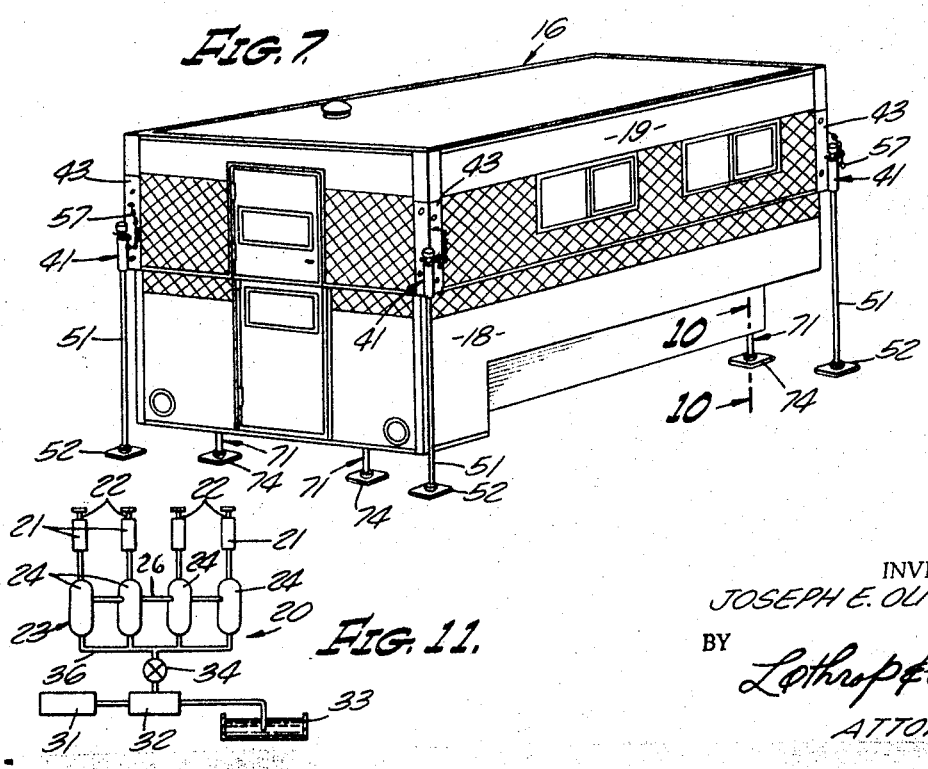
INVENTOR.
JOSEPH E. OLIVER
BY
Lothrop & West
ATTORNEYS

United States Patent Office 3,462,123
Patented Aug. 19, 1969

3,462,123
JACKING AND SUPPORT MECHANISM FOR VERTICALLY EXTENSIBLE CAMPER
Joseph E. Oliver, Le Grand, Calif., assignor of ten percent to Lester J. Gendron, Madera, Calif.
Filed Sept. 19, 1966, Ser. No. 580,382
Int. Cl. B66f 7/26; B60p 1/64, 3/32
U.S. Cl. 254—45                                    5 Claims

ABSTRACT OF THE DISCLOSURE

A plurality of relatively long supporting legs is removably attached to the upper compartment of a camper body having a lower compartment vertically relatively movable with respect to the upper compartment. A plurality of relatively short supporting legs is removably attached to the lower compartment. By appropriately manipulating the attendant compartment moving mechanism, the camper body can readily be transferred from a vehicle-supported location to a ground-supported position, and vice versa.

---

The invention relates to devices for loading and unloading a camper body onto and from a carrying vehicle, such as a pickup truck and for supporting the camper body during storage.

More particularly, the invention relates to a jacking and support mechanism for especial use with a vertically extensible camper of the variety shown and described in my co-pending patent application, Ser. No. 398,852, filed Sept. 24, 1964, for an invention entitled, Camper Vehicle Body, said application having matured into Patent No. 3,288,518, dated Nov. 29, 1966.

Said Camper Vehicle Body invention includes, among other features, a camper body having a lower enclosure, or lower compartment, and an upper enclosure, or upper compartment, the compartments being arranged for relative vertically telescoping movement, together with means for effecting the necessary relative vertical movement between the two compartments.

One of the advantages inherent in a telescoping arrangement is that when the supporting vehicle is moving, the camper, being in fully retracted position, offers a minimum of wind resistance. Upon reaching a camping spot, however, the upper compartment is raised by the lifting means to its fully elevated position, thus providing all the head room and other space normally found in large campers of the non-telescoping variety.

Advantage is taken of the relative vertical movement between the upper and lower compartments, as called for in the above-identified copending application, in the jacking and support mechanism of the instant invention.

It is, in fact, one of the objects of the present invention to provide a jacking and support mechanism which utilizes, for its operation, the same lifting means employed in such vertically extensible campers to effect telescoping.

It is another object of the invention to provide a jacking and support mechanism which entirely eliminates the need for cumbersome and potentially dangerous screw jacks, wooden support blocks and other similar expedients.

It is a further object of the invention to provide a jacking and support mechanism which is relatively inexpensive, involves but few parts and can readily be installed either as original factory equipment or to existing campers.

It is still a further object of the invention to provide a jacking and support mechanism which requires but minimum effort to use, yet is entirely safe and reliable.

It is another object of the invention to provide a generally improved jacking and support mechanism for use with a vertically extensible camper.

Other objects, together with the foregoing, are attained in the embodiment described in the following description and illustrated in the accompanying drawings in which:

FIGURE 3 is a side elevational view showing the upper enclosure in elevated position, and with the four long supporting legs installed in the sockets located on the corners of the upper enclosure;

FIGURE 4 is a view comparable to that of FIGURE 3, but at a later sequence in the unloading procedure;

FIGURE 5 is comparable to FIGURE 4, but with the camper fully removed from the pickup truck, and with the four short supporting legs mounted on the bottom of the lower enclosure, preparatory to lowering the lower enclosure;

FIGURE 6 is comparable to FIGURE 5, but with the lower enclosure in lowermost position;

FIGURE 7 is a rear perspective of the camper in fully ground supported and vertically extended condition;

FIGURE 11 is a schematic diagram of the hydraulic actuating system.

Figure 1:
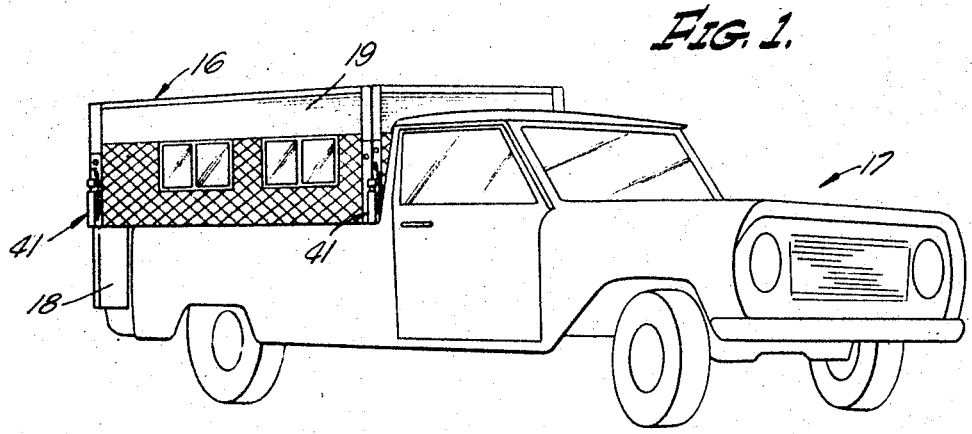
FIGURE 1 is a perspective view of a telescoping camper in fully lowered, or retracted position, mounted on a typical camper carrying type of vehicle, such as a pickup truck.

While the jacking and support mechanism of the invention is susceptible of numerous physical embodiments, depending upon the environment and requirements of use, considerable numbers of the herein shown and described embodiment have been made, sold and used, and all have performed in an eminently satisfactory manner.

The latter years have witnessed a notable increase in the use of campers of many kinds, the campers ordinarily being mounted on a suitably configured and adequately powered vehicle.

Inclusive of such devices is a telescoping camper, generally designated by the reference numeral 16, supported on the bed of and appropriately secured to a pickup truck 17.

Figure 2:
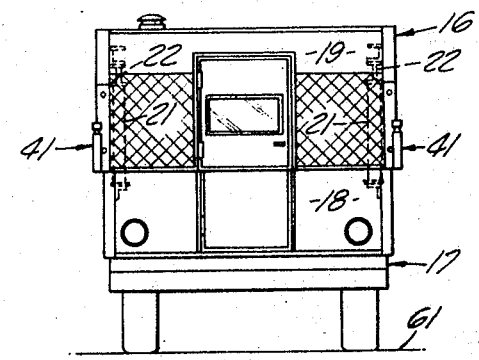
FIGURE 2 is a rear elevational view.

The telescoping camper 16 (see FIGURE 2) comprises a lower enclosure 18, or lower compartment, mounted on the truck, and a superposed, upper enclosure 19, or upper compartment, arranged for telescoping movement relative to the lower compartment.

When the vehicle is in motion, the upper compartment is in lowermost position as in FIGURE 1, to afford a low profile, or low silhouette, to minimize wind resistance.

Upon reaching camp, the upper enclosure 19 is raised, as in FIGURE 3, to provide the desired head room and other interior space.

Relative vertical movement between the upper and lower compartments is preferably afforded by a plurality of hydraulic cylinders 21 and pistons 22 located adjacent each interior corner of the camper body 16 (see FIGURES 2 and 11) the structure and mode of operation of the hydraulic system being shown and described in detail, as stated above, in my co-pending application Ser. No. 398,852. If desired, the pistons 22 can be mounted exteriorly adjacent the corners of the camper body 16.

FIGURE 11 illustrates the hydraulic system 20 in simplified, schematic form, the four identical cylinders 21 and the four pistons 22, each located in one of the four interior corners of the camper body, being actuated by movement of the hydraulic fluid through a device termed a proportionator 23 comprising in substance four positive displacement devices 24, such as gear pumps, located in parallel arrangement. A common shaft 26 connects and actuates all four of the corresponding internal gears (not shown) of the pumps 24, thus passing the same amount of hydraulic fluid to each of the cylinders 21 so that each of the pistons 22 is displaced by exactly the same amount.

An electric motor 31 drives a pump 32 to withdraw fluid from a reservoir 33. An appropriate four-way valve 34 is interposed between the pump 32 and a manifold 36 connected to the proportionator device 23.

By appropriate manipulation of the valve 34 relative vertical movement between the upper compartment 19 and the lower compartment 18 is afforded.

In the usual case, the user will, upon arriving at camp, merely turn on the electric motor switch and manipulate the valve to effect raising of the upper compartment to the position shown in FIGURE 3, followed by closing the valve and turning off the motor switch, the back leakage of hydraulic fluid being ordinarily so minimal as to be disregarded. If desired, however, the pistons 22 can be locked in their uppermost position by any suitable mechanical locking arrangement, such arrangement forming no part of the present invention and therefore being neither shown nor described in detail.

Frequently, however, the user will wish, even in camp, to unload the camper from the vehicle and place the camper on the ground while retaining full use of the camper for living purposes. By so separating the vehicle and the camper, the vehicle is rendered capable of independent use.

Furthermore, upon returning home, the user will ordinarily desire to remove the camper either for storage or, in many cases, for extra living accommodations.

I have, therefore, consistent with the objects of the invention, provided means for readily loading and unloading the camper and for supporting the camper on the ground.

Inclusive of such means is a plurality of pipe sockets, generally designated by the reference numeral 41, strongly secured, as by weldments 42 (see FIGURE 9), to an exterior angle iron 43, mounted on each of the four corners of the upper enclosure 19.

Each of the four corner pipe sockets 41 comprises an upper pipe section 44 and a lower pipe section 46 separated therefrom by an annular gap 47.

Each of the sockets 41 is adapted to receive and fairly snugly encompass the upper end of a corresponding long pipe support 51 terminating at its lower end in a flanged footing 52.

The pipe 51 is releasably secured in the socket 41 against either upward or downward translation owing to the provision of a transverse pin 53, or latch, extending through a suitable cross bore 54 in the pipe and across the annular gap 47 separating the upper socket portion 44 and the lower socket portion 46.

Figure 8:
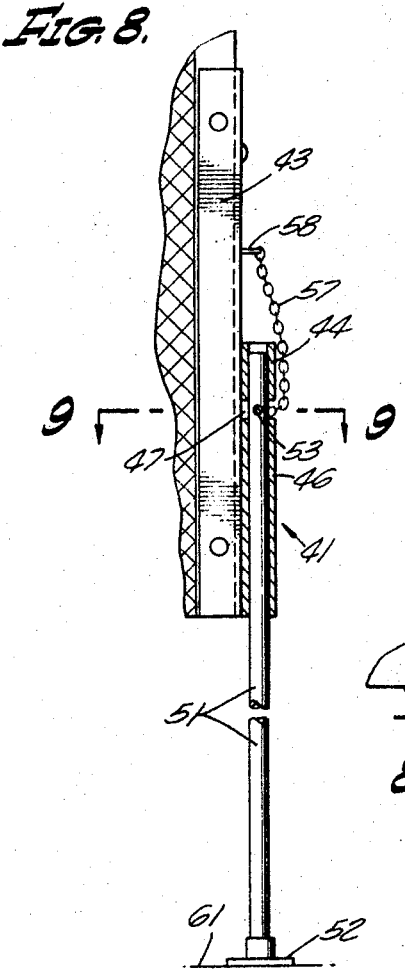
FIGURE 8 is a fragmentary sectional view, to an enlarged scale, of the pipe socket and the supporting pipe structure, the plane of the section being indicated by the line 8—8 in FIGURE 9.

Preferably, to prevent loss of the pin, one end of the pin is formed with an eye 56 to which is fastened a chain 57, the chain also being secured to an eye-bolt 58 affixed to the camper body (see FIGURE 8).

Particular reference is now had to FIGURES 3–6 to illustrate the sequence in unloading the camper from the vehicle.

With the upper compartment 19 in vertically extended position, as in FIGURE 3, the four long legs 51 are inserted into their respective corner sockets 41 and the pin latches 53 are placed in position, as appears in FIGURE 3.

The four-way valve 34 is thereupon manipulated so that the upper compartment 19 is lowered until the foot members 52 at the bottom of the long pipes 51 come into weight supporting engagement with the ground 61 (see FIGURE 4).

The long pipes 51 are of a length such that as the feet 52 meet the ground 61, the upper compartment 19 is not in fully retracted, or lowered, position. Instead, the upper compartment 19 is within an inch or two of its lowermost position, as indicated by the vertical distance designated by the reference numeral 62 in FIGURE 4.

At this juncture, with the upper compartment's weight being borne by the ground-supported long pipes 51, the four-way valve 34 is manipulated so that the lower compartment 18 is lifted upwardly off the truck bed toward the now-stationary upper compartment 19. In other words, the valve setting and appropriate connecting conduits causes the cylinder 21 to move upwardly with respect to the fixed piston 22.

A slight upward movement of the cylinder 21, and the lower compartment 18 attached thereto, is sufficient to lift the bottom of the lower compartment free of the truck bed, thus permitting the truck to be driven ahead in the direction of the arrow 66 and away from the ground supported camper (see FIGURE 4).

With the lower compartment 18 at approximately truck bed height, it is a relatively easy matter to mount a plurality of short supporting legs 71 on the bottom of the lower compartment 18 (see FIGURE 5).

Figures 9, 10:
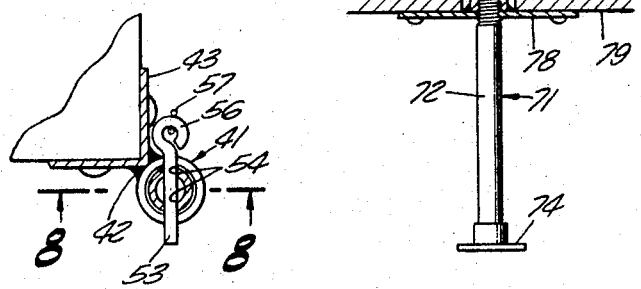
FIGURE 9 is a fragmentary sectional view, to a greatly enlarged scale, of the pipe latching structure, the plane of the section being indicated by the line 9—9 in FIGURE 8.
FIGURE 10 is a fragmentary sectional view, to an enlarged scale, of the short supporting leg structure, the plane of the section being indicated by the line 10—10 in FIGURE 7.

As appears most clearly in FIGURE 10, each of the short supporting legs 71 includes a pipe 72, or bar, with threads 73 at its upper end and a weight-bearing, flanged foot 74 at its lower end. The threads 73 are engageable with a threaded sleeve 76 disposed within a socket 77 sturdily mounted on a plate 78 secured to the bottom 79 of the lower compartment 18.

After the short supporting legs 71 are affixed to the bottom of the lower compartment 18, the valve 34 is suitably manipulated to cause the lower compartment 18 to move downwardly until the supporting flanges 74 of the short legs 71 come into weight bearing engagement with the ground 61 (see FIGURE 6), the valve 34 being thereupon closed and the electric motor 31 turned off.

The camper 16, at this point, appears as in FIGURE 7, available for occupancy, if desired.

Should it be necessary to re-load the camper 16 on the truck 17, the foregoing procedures are reversed.

It can therefore be seen that I have provided a jacking and support mechanism for a vertically telescoping camper which operates quickly and conveniently, yet which is entirely reliable and safe in use.

What is claimed is:

1. A jacking and support mechanism for a camper comprising in combination:

(a) a lower camper compartment arranged to be carried on a vehicle;

(b) an upper camper compartment carried on said lower compartment in vertically extensible and telescoping relation with respect to said lower compartment;

(c) a plurality of relatively long weight bearing members detachably mountable on said upper compartment; and (d) means for vertically moving said upper compartment relative to said lower compartment between a first retracted position wherein the weight of said upper and said lower compartments is supported by said vehicle; and a second extended position wherein said relatively long weight bearing members are mounted on said upper compartment and are in ground-supported location and wherein said lower compartment is elevated above said supporting vehicle to enable said vehicle to withdraw.

2. A device as in claim 1 further including a plurality of relatively short weight bearing members detachably mountable on said lower compartment, and wherein said compartment moving means is further operable to move said lower compartment between said second position and a third position wherein said relatively short weight bearing members are in ground-supporting location.

3. A jacking and support mechanism as in claim 1 wherein said compartment moving means includes a plurality of hydraulically actuated plungers operatively connecting said compartments, hydraulic pump means for effecting the flow of hydraulic fluid to said plungers, and valve means for controlling the direction and extent of relative movement of said plungers.

4. A device as in claim 3 further including proportionator means for equalizing the flow to said plungers.

5. A device as in claim 2 wherein said weight bearing members comprise pipes, and include means for detachably securing said pipes to said compartments.

References Cited

UNITED STATES PATENTS

| | | | |
|---|---|---|---|
| 2,517,304 | 8/1950 | Greening | 254—45 X |
| 2,879,103 | 3/1959 | Hall. | |
| 2,944,852 | 7/1960 | Snyder | 296—23 |
| 3,339,321 | 9/1967 | Schmidt | 52—66 |

OTHELL M. SIMPSON, Primary Examiner

U.S. Cl. X.R.

214—515; 296—23